US012495281B2

(12) United States Patent
Toth et al.

(10) Patent No.: US 12,495,281 B2
(45) Date of Patent: Dec. 9, 2025

(54) COMMUNICATION MANAGEMENT USING RULES-BASED DECISION SYSTEMS AND ARTIFICIAL INTELLIGENCE

(71) Applicant: Honeywell International Inc., Morris Plains, NJ (US)

(72) Inventors: Louis T. Toth, Baltimore, MD (US); Aloke Roy, Gaithersburg, MD (US); Michal Skorepa, Brno (CZ); Jiri Hegr, Sosuvka (CZ)

(73) Assignee: Honeywell International Inc., Charlotte, NC (US)

( * ) Notice: Subject to any disclaimer, the term of this patent is extended or adjusted under 35 U.S.C. 154(b) by 917 days.

(21) Appl. No.: 16/669,159

(22) Filed: Oct. 30, 2019

(65) Prior Publication Data
US 2021/0134084 A1 May 6, 2021

(51) Int. Cl.
*H04W 4/40* (2018.01)
*G06N 5/022* (2023.01)
(Continued)

(52) U.S. Cl.
CPC .............. *H04W 4/40* (2018.02); *G06N 5/022* (2013.01); *G06N 20/00* (2019.01); *G07C 5/0808* (2013.01);
(Continued)

(58) Field of Classification Search
CPC .... G07C 5/0808; G07C 5/0841; G06N 20/00; G06N 5/022
See application file for complete search history.

(56) References Cited

U.S. PATENT DOCUMENTS

| 4,999,833 A | 3/1991 | Lee |
| 7,729,263 B2 | 6/2010 | True et al. |
| (Continued) | | |

FOREIGN PATENT DOCUMENTS

EP 2023685 A1 2/2009

OTHER PUBLICATIONS

European Patent Office, "Extended European Search Report from EP Application No. 20201897.4", from Foreign Counterpart to U.S. Appl. No. 16/669,159, Dec. 4, 2020, pp. 1 through 9, Published: EP.
(Continued)

*Primary Examiner* — Vivek D Koppikar
*Assistant Examiner* — Jeffrey R Chalhoub
(74) *Attorney, Agent, or Firm* — Fogg & Powers LLC (57) ABSTRACT

Systems and methods for communication management using rules-based decision systems and artificial intelligence are provided herein. In certain embodiments, a system includes a memory unit that stores a knowledge base, wherein the knowledge base stores parametric rules associated with the selection of a communication channel in one or more communications channels, status, performance and usage metrics for communications through the one or more communication channels, vehicle state information, and pre-configured policy on use of communication channels. Also, the system includes a processing unit configured to acquire data related to vehicle state and communication through the one or more communication channels. Additionally, the processing unit is configured to update the knowledge base with updated parametric rules without stopping execution of software, wherein the updated parametric rules are created using machine learning performed on the acquired data and the information associated with the performance goals.

20 Claims, 8 Drawing Sheets

(51) Int. Cl.
*G06N 20/00* (2019.01)
*G07C 5/08* (2006.01)
*H04L 41/0894* (2022.01)

(52) U.S. Cl.
CPC ........ *G07C 5/0841* (2013.01); *H04L 41/0894* (2022.05)

(56) References Cited

U.S. PATENT DOCUMENTS

| | | | |
|---|---|---|---|
| 8,284,674 | B2 | 10/2012 | True et al. |
| 9,107,147 | B1 | 8/2015 | Meng et al. |
| 2011/0255506 | A1 | 10/2011 | Toth et al. |
| 2013/0024060 | A1* | 1/2013 | Sukkarie ................ H04L 67/12 701/22 |
| 2015/0222708 | A1* | 8/2015 | Addepalli ........... H04L 61/2592 709/217 |
| 2019/0090180 | A1 | 3/2019 | Judd et al. |
| 2019/0132781 | A1 | 5/2019 | Arnold et al. |
| 2019/0200283 | A1 | 6/2019 | Graybeal et al. |
| 2019/0265712 | A1* | 8/2019 | Satzoda ............... G05D 1/0221 |

OTHER PUBLICATIONS

European Patent Office, "Communication pursuant to Article 94(3)", from EP Application No. 20201897.4, from Foreign Counterpart to U.S. Appl. No. 16/669,159, Dec. 15, 2022, pp. 1 through 8, Published: EP.

European Patent Office, "Communication pursuant to Article 94(3)", from EP Application No. 20201897.4, from Foreign Counterpart to U.S. Appl. No. 16/669,159, Jul. 19, 2023, pp. 1 through 7, Published: EP.

European Patent Office, "Communication pursuant to Article 94(3)", dated Feb. 26, 2024, from EP Application No. 20201897.4, from Foreign Counterpart to U.S. Appl. No. 16/669,159, pp. 1 through 5, Published: EP.

* cited by examiner

COMMUNICATION MANAGEMENT USING RULES-BASED DECISION SYSTEMS AND ARTIFICIAL INTELLIGENCE

BACKGROUND

Vehicle communication applications may communicate with other vehicles or with other applications through different access subnetworks. For example, when the vehicle is an aircraft, vehicle communication applications may include air traffic service, information services, guidance and navigation services, surveillance services, digital voice, aeronautical operational control, aeronautical administrative communications, and aeronautical passenger communications. The various vehicle communication applications may have different communication requirements. For example, some applications may have different quality of service needs like different latency, throughput, and other requirements. The different access subnetworks through which vehicles communicate may have different service capabilities and some access subnetworks may be better suited for communications associated with different applications. Also, as vehicles may travel from region to region, the services and types of access subnetworks may change. Further, different organizations that manage fleets of vehicles may have access subnetwork preferences based on media capabilities and contractual agreements.

To select a desired access subnetwork, vehicular communication systems may use policy-based rules to identify desired access subnetwork when the vehicle is traveling. For example, a communication system may use programmed logic to apply selection rules while using real-time inputs such as the vehicle state, geographical position, communication application needs, and access subnetwork conditions and availability. Also, the programmed logic may control the operation of devices on the vehicle for communicating through the different access subnetworks.

Typically, the rules may be programmed into the executing software but parameter values for the rules may be configured via a data loading mechanism. Accordingly, the rules and parameter types may be fixed according to a software version but the parameter values may be updatable. For example, the parameter values may be updated by loading configuration data and installing parameter values for operational use while the vehicle is not in operation. In some implementations the parameter values may be sent to the vehicle through a access subnetwork for future installation or activation when the vehicle is no longer operating.

SUMMARY

Systems and methods for communication management using rules-based decision systems and artificial intelligence are provided herein. In certain embodiments, a system includes a memory unit that stores a knowledge base, wherein the knowledge base stores parametric rules associated with the selection of a communication channel in one or more communications channels, status, performance and usage metrics for communications through the one or more communication channels, vehicle state information, and pre-configured policy on use of communication channels. Also, the system includes a processing unit configured to acquire data related to vehicle state and communication through the one or more communication channels. Additionally, the processing unit is configured to update the knowledge base with updated parametric rules without stopping execution of software, wherein the updated parametric rules are created using machine learning performed on the acquired data and the information associated with the performance goals.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Systems and methods for providing communication management using rules-based decision systems and artificial intelligence are described herein. In some embodiments, methods discussed herein may flexibly create and update both rules and parameters, chain the rules in a desired order of the decision process and in combinations to create more complex rules, and bind the configurable parameters to the rules, without updating or upgrading the installed software.

In some embodiments, the software executes the chaining of the rules during operation. When chaining the rules, the software may utilize information about the vehicle and communication networks as real-time inputs for the constructed rules-based logic. For example, the software may use input such as vehicle state, vehicle geographical position, vehicle data communication needs, access subnetwork conditions, and access subnetwork status to select the access subnetwork to use for communications for various applications executing on the vehicle and to connect application data flows to the interfaces for the selected access subnetworks. The logic may also control operation of the radios that communicate through particular access subnetworks depending on the management control functions exposed by the radios.

In certain embodiments, where a vehicle is part of a fleet of vehicles and associated with the operations center for the fleet tools may be provided to allow the operations center to build and update the rule set and update the parameter values. The rules and parameter updates may be sent to the vehicle, using one of the selected access subnetworks, directly into a managing device on the vehicle or for staging in a server device such as a data loader device for later installation when the vehicle is not in operation. Additionally, the rules and parameter updates may be modified by the managing device through machine learning algorithms. The rules may be installed, and the rules and parameters may be updated at times that are convenient for the operation of the vehicle such that the installation and updating processes do not interfere with the operation of the vehicle.

Accordingly, embodiments described herein provide for rules where the chaining of rules, the ordering of rules, and the binding of parameters to each rule are flexibly created using centrally managed tools that create an update rule sets. Additionally, policy decision engine software may be installed in a one time installation, where the software can use the rule sets without the need for new software versions when new and updated rules are made. Further, new and updated rule sets may be automatically uplinked, loaded, and installed on the vehicle without the need for manual administrative configurations. Moreover, new and updated rule sets may be uplinked to the vehicle using any access subnetwork without affecting the operation of the vehicle and without the use of manual data loading using physical media. Also, the rule base may be improved through machine learning without needing to maintain and update the rules base through centrally managed tools.

Figure 1:
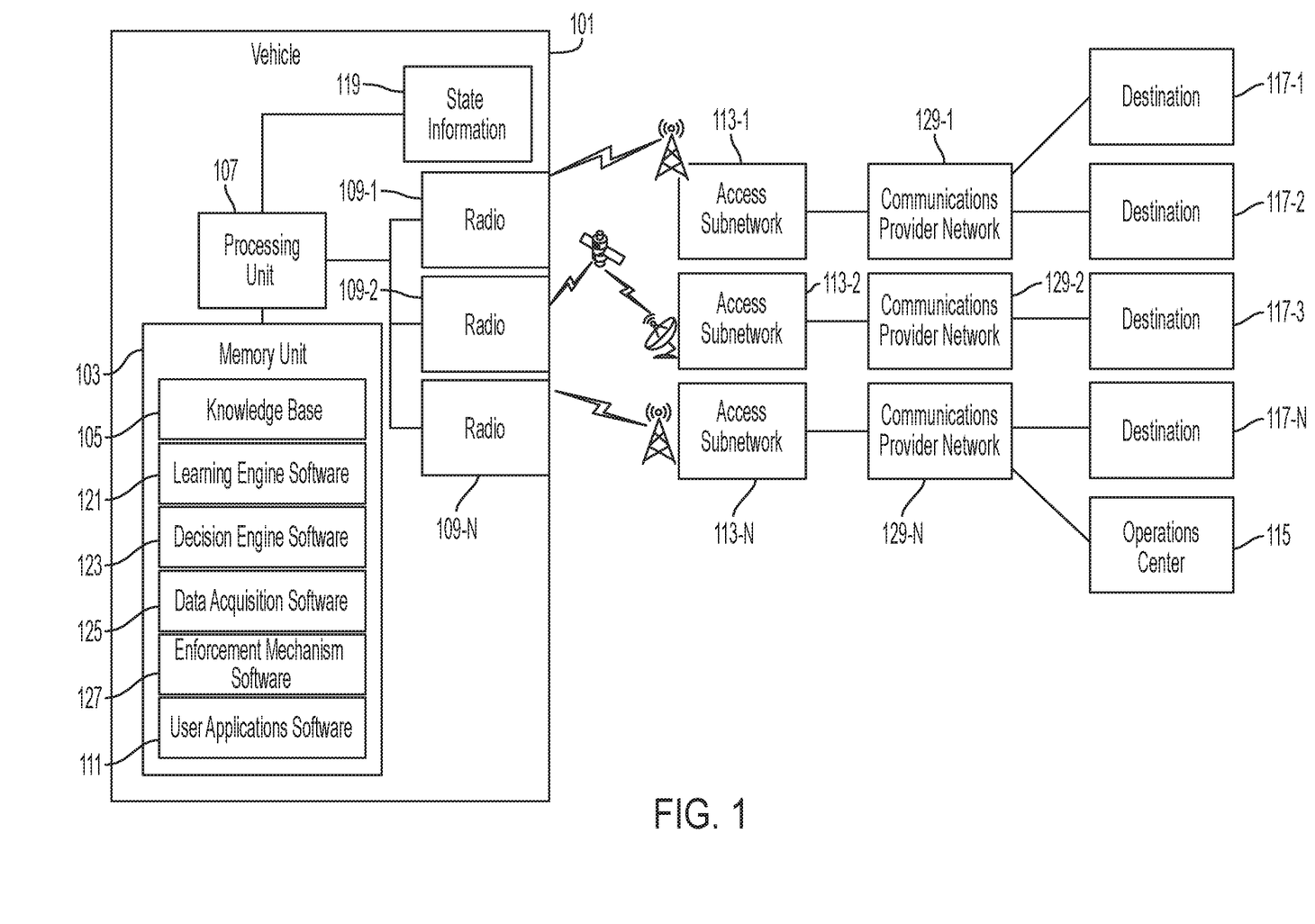
FIG. 1 is a block diagram of a vehicle communicating through one or more access subnetworks according to an aspect of the present disclosure.

FIG. 1 is a block diagram illustrating a vehicle 101 that is capable of communicating through multiple communication channels, referred to herein as access subnetworks 113. A vehicle 101 may refer to any machine or device that is capable of movement. For example, the vehicle 101 may be an aircraft, a spacecraft, a sea craft, an automobile, or other mechanical device capable of movement. In some embodiments, a communication system or device may reside on the vehicle 101, where the communication system is capable of communicating through multiple access subnetworks 113 (where the access subnetworks are referred to generally as access subnetworks 113 and individually as access subnetwork 113-1-113-N). To communicate through the access subnetworks 113, the vehicle 101 may include one or more radios 109 (where the radios are referred to generally as radios 109 and individually as radio 109-1-109-N). The access subnetworks may allow the vehicle 101 to communicate with one or more destinations 117, where a destination 117 is a communication system remotely located in relation to the vehicle 101 that may receive communications from the vehicle 101. Additionally, the access subnetworks 113 may allow the vehicle 101 to communicate with an operations center 115, where the operations center 115 is a managing organization that controls some aspect of the operation of the vehicle 101. As illustrated, the access subnetworks 113 may be connected to the destination 117 and the operations center 115 through the respective Communications Provider Network 129 using wired or fiberoptic connections. The state information 119 provides information about vehicle state for purposes of communications management, and may include geographic position, speed and direction vector, three-dimensional attitude of the vehicle, phase of mission, etc.

In certain embodiments, the vehicle 101 may include one or more processing units 107 that execute computer executable instructions, where the instructions direct the processing unit to manage communications with the one or more access subnetworks 113. In some embodiments, the computer executable instructions may be stored on a memory unit 103 for execution, another memory storage device within the vehicle 101, received through one or more of the access subnetworks 113 and executed as instructions are received by the processing unit 107, and the like.

The processing unit 107 or other computational devices found within the vehicle 101 may be implemented using software, firmware, hardware, or other appropriate combination thereof. The processing unit 107 and other computational devices may be supplemented by, or incorporated in, specially-designed application-specific integrated circuits (ASICs) or field programmable gate arrays (FPGAs). The processing unit 107 and other computational devices may also include or function with software programs, firmware, or other computer readable instructions for carrying out various process tasks, calculations, and control functions used in the present methods and systems.

Further, the methods described herein may be implemented by computer executable instructions such as program modules or components, which are executed by at least one processing unit, such as the processing unit 107. Generally, program modules include routines, programs, objects, data components, data structures, algorithms, and the like, which perform particular tasks or implement particular abstract data types. Instructions for carrying out the various process tasks, calculations, and generation of other data used in the operations of the methods described herein may be implemented in software, firmware, or other computer readable instructions. These instructions are typically stored on any appropriate computer program product that includes a computer-readable medium used for storage of computer-readable instructions or data structures. The computer-readable medium may be any available media that can be accessed by a general purpose or special purpose computer or processor, or any programmable logic device. In certain implementations, the computer readable medium may be stored on the memory unit 103.

Suitable computer-readable storage media, such as that found as part of the memory unit 103, may include, for example, non-volatile memory devices including semi-conductor memory devices such as random access memory (RAM), read only memory (ROM), electrically erasable programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

In certain embodiments, the memory unit 103 may store user applications software 111. Other user applications may be hosted on other devices on the vehicle, such that the other devices are connected to the processing unit 107 via onboard interfaces. As described herein, user applications software 111 refers to groups of executable instructions that, when executed together, cause the processing unit 107 to perform particular tasks related to the vehicle's missions. User applications software 111 are user applications. The communications management software stored in the memory unit 103 may include the following components: learning engine software 121, decision engine software 123, data acquisition software 125, and enforcement mechanism software 127. The communications management software performs the work to select the access subnetworks and manage connectivity for the applications 111 to communicate with destinations 117 for the purpose of executing the vehicle missions. Likewise, the communications management software communicates with the operation center 115 for purposes described above.

In certain embodiments, the communications that result from the execution of the user applications software 111 for transmission through one of the radios 109 may be better suited for transmission through a particular access subnetwork 113 in the available access subnetworks 113. To determine which access subnetwork to use for the transmission of data, the memory unit 103 may store knowledge base 105, which is the on-vehicle repository of the knowledge information, policy and rules-based logic to make and enforce communications management decisions. The knowledge base 105 may include facts for decision making and may be initialized prior to vehicle deployment and then managed and enhanced from knowledge gained through vehicle missions and machine learning. The policy consists of mission goals for data communications needed by the applications, and user policy based on regulatory rules and service level agreements with communication providers. The goals for data communications are specified as needed quality of service. The rules-based logic is constructed based on the knowledge and policy, and modified through the machine learning process. When executed by the processing unit 103, rules-based logic may direct the processing unit 107 to select a access subnetwork 113 for transmission of information, and manage the on-vehicle routing of information data flows through the selected access subnetwork 113. Also, the rules-based logic 105 may provide instructions for controlling the radios 109. For example, communication management software may direct the processing unit 107 to transmit data through one of the access subnetworks 113. The processing unit 107 may execute the rules-based logic 105 to determine that the access subnetwork 113-1 is best suited for the transmission of information to a particular destination 117. Accordingly, the processing unit 107 may transmit information through the radio 109-1 that is associated with the access subnetwork 113-1. To properly effect transmission through the radio, the communication management software may control the radio, for example power up the radio, change the transmission power level, initiate link establishment, etc. In addition, the communication management software may power down another radio that is not needed, or initiate link connection termination in one or more radios.

The data acquisition software 125 acquires information from other vehicle system components and provides the information to the learning engine software 121 to effectively form a feedback loop. The feedback information may include connectivity status, network performance, and actual QoS experienced by user applications 111. The learning engine software 121 may use this feedback information in addition to inputs consisting of radio availability, state and status, vehicle state, and user application demand. It applies the feedback and inputs to a learning algorithm, which updates the decision logic for selecting and controlling radios and configuring connectivity onboard the vehicle via the enforcement mechanism software 127.

Figure 2:
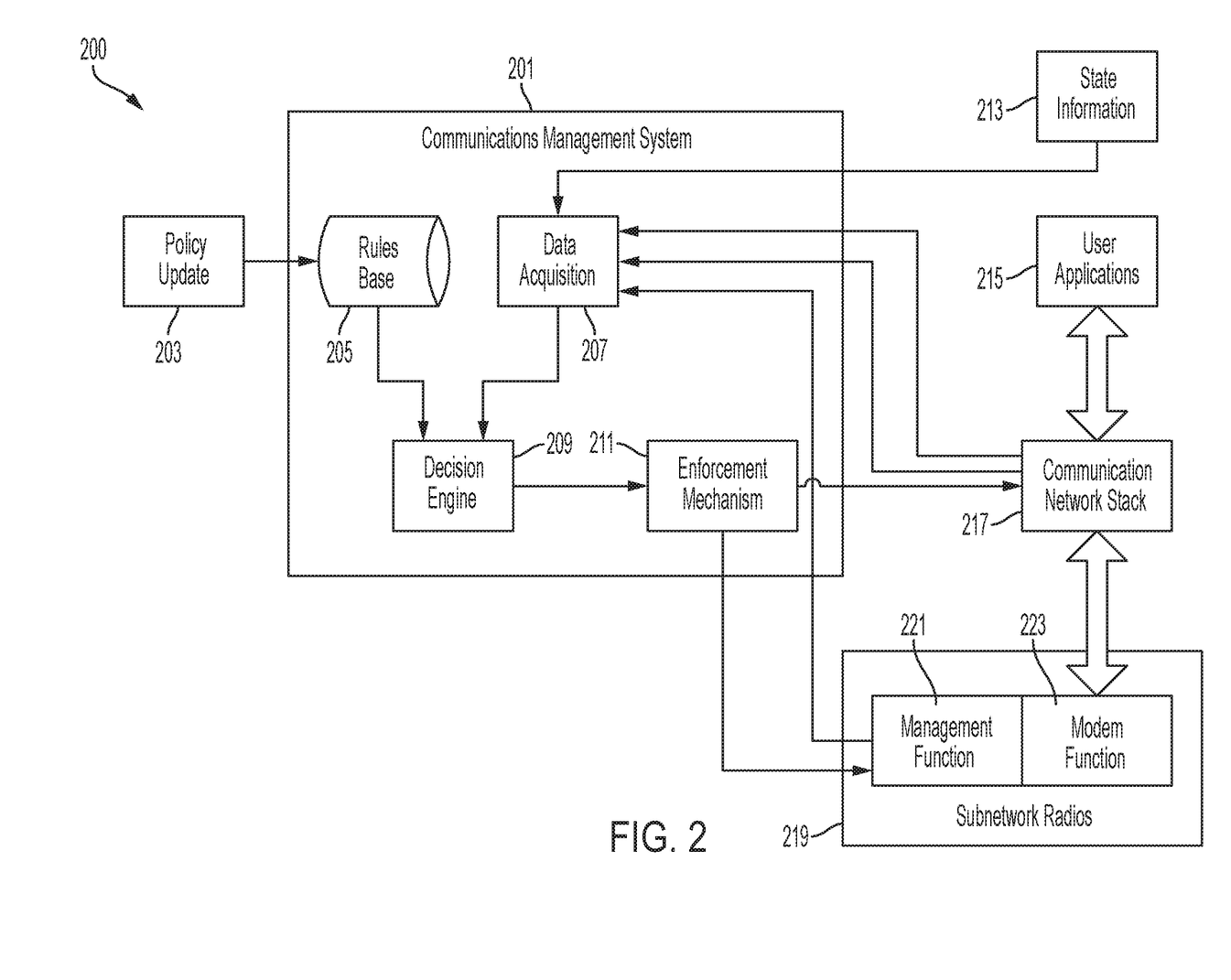
FIG. 2 is a block diagram illustrating an exemplary embodiment of a pre-configured, rules-based decision system according to an aspect of the present disclosure.

FIG. 2 is a block diagram illustrating an exemplary embodiment of a pre-configured, rules-based decision system 200 without machine learning. As used herein, the rules-based decision system 200 may be a system that manages communications through various access subnetworks. In particular, the rules-based decision system 200 applies rules to acquired data to determine which access subnetwork to use for communications for a particular application, such as the applications associated with the user applications software 111 that is executed by the processing unit 107. As described herein, the Rules Base 205 may be similar to the rules-based logic in the Knowledge Base 105.

In some embodiments, the rules-based decision system 200 may be associated with a communication management system 201. For example, a communications management system 201 may be a device that acquires information regarding multiple communication links available to a vehicle and manages the transmission and reception of information that is transmitted through the communication links. For example, the communication management system 201 may be on an aircraft. During operation of the aircraft, various software applications may be executed by one or more processing units on the aircraft, where the executing applications may generate messages for transmission to one or more remote destinations. The aircraft may have multiple radios for communicating through multiple access subnetworks in a manner similar to the system described above in FIG. 1.

In certain embodiments, the communication management system 201 includes a decision engine 209. As described herein, the decision engine 209 may refer to computer executable instructions, that when executed, cause a processing unit (such as processing unit 107) to determine which access subnetwork, of various access subnetworks, to use for communications created by the various applications executed by processing units on a vehicle. In some embodiments, the decision engine 209 uses information acquired from a data acquisition 207 and a rules base 205 to determine which access subnetwork to use for communications. As used herein, the data acquisition 207 may be a data structure into which information is stored or the data acquisition 207 may be computer readable instructions that direct a processing unit, such as the decision engine 209, to acquire information, where the information is pertinent to determining which access subnetwork to use for transmissions. Also, the decision engine 209 may use information acquired from a rules base 205. As used herein, the rules base 205 may refer to a series of rules and policies that are applicable by the decision engine 209 when deciding which access subnetwork to use for communications.

In some embodiments, the information acquired by the data acquisition 207 represents the state of the vehicle and access subnetworks through which the vehicle may communicate. As illustrated, the rules-based decision system 200 may include state information 213. As used herein, the state information 213 may represent data associated with the present state of the vehicle. For example, the state information 213 may represent the position, velocity, time, trajectory, available communication options, flight phase, attitude of the vehicle, operating environment, and the like. The data acquisition 207 may receive information from the state information 213.

Additionally, the data acquisition 207 may receive information from a communication network stack 217. As shown, the rules-based decision system 200 may include a communication network stack 217. The communication network stack 217 may provide an interface between user applications and the various radios on the vehicle. For example, the rules-based decision system 200 may include user applications 215, where the user applications 215 function similarly to the user applications software 111 described above in FIG. 1. During the operation of the vehicle, a user application 215 may request communication usage changes, which requests may be communicated by the communication network stack to the data acquisition 207. Additionally, the communication network stack 217 may communicate network statistics to the data acquisition 207.

As illustrated, the communication network stack 217 is in communication with a access subnetwork radio 219. In particular, the user application 215 provides and receives messages through the communication network stack 217 to the access subnetwork radios 219, where the access subnetwork radio 219 transmits information received from the communication network stack 217 and provides information received through a access subnetwork to the communication network stack 217, where the information is then provided for processing by a processing unit in association with the correct user application 215.

In some embodiments, the access subnetwork radio 219 may include a management function 221 and a modem function 223. As used herein, the management function 221 may provide an interface, where an external device can send messages through the interface to manage the operation of the access subnetwork radios 219. Additionally, the management function 221 may send messages to the data acquisition 217 representing the status and control of the various access subnetwork radios, channel access, and other information related to the operation of the access subnetworks. As used herein, the modem function 223 receives data from the communication network stack 217 and prepares it for transmission through a access subnetwork. Also, the modem function 223 receives a signal through the access subnetwork and demodulates it for subsequent processing by an associated user application 215.

In certain embodiments, when the data acquisition 207 has acquired the requisite data from the various data sources, the decision engine 209 accesses the data and applies the rules specified in the rules base 205 to identify a particular access subnetwork for transmitting a particular message and changes to the communication network stack 217 and access subnetwork radios 219. When the decision engine 209 makes a decision, the decision engine 209 communicates the decision to an enforcement mechanism 211. The enforcement mechanism 211 may be software or hardware that transmits messages to the communication network stack 217 and the access subnetwork radios 219 to carry out the decision received from the decision engine 209. For example, the enforcement mechanism 211 may send changes to configuration of interfaces between data flows between the user applications 215 and the access subnetwork radios 219 along with other connectivity configurations. Additionally, the enforcement mechanism 211 may send messages to the management function 221 that direct the operation of the management function 221 within the access subnetwork radios 219.

As illustrated in FIG. 2, the rules base 205 is programmed as part of the communications management system 201. The rules base 205 can receive new parameter values through a policy update 203, that is typically loaded via a data loading mechanism. Accordingly, the programmed rules base 205 is fixed by the software version of the communications management system 201. Also, the parameter types are similarly fixed by the software version of the communications management system 201, while the parameter values may be loaded as configuration data by a data loader service or through an uplinked through one of the access subnetwork radios 219. When the communications management system 201 receives the policy update 203, the communications management system 201 may wait until the vehicle is in a safe state for installation of the policy update 203. For example, when the vehicle is an aircraft, the communications management system 201 may wait until the aircraft is on the ground before installation of the policy update 203.

Figure 3:
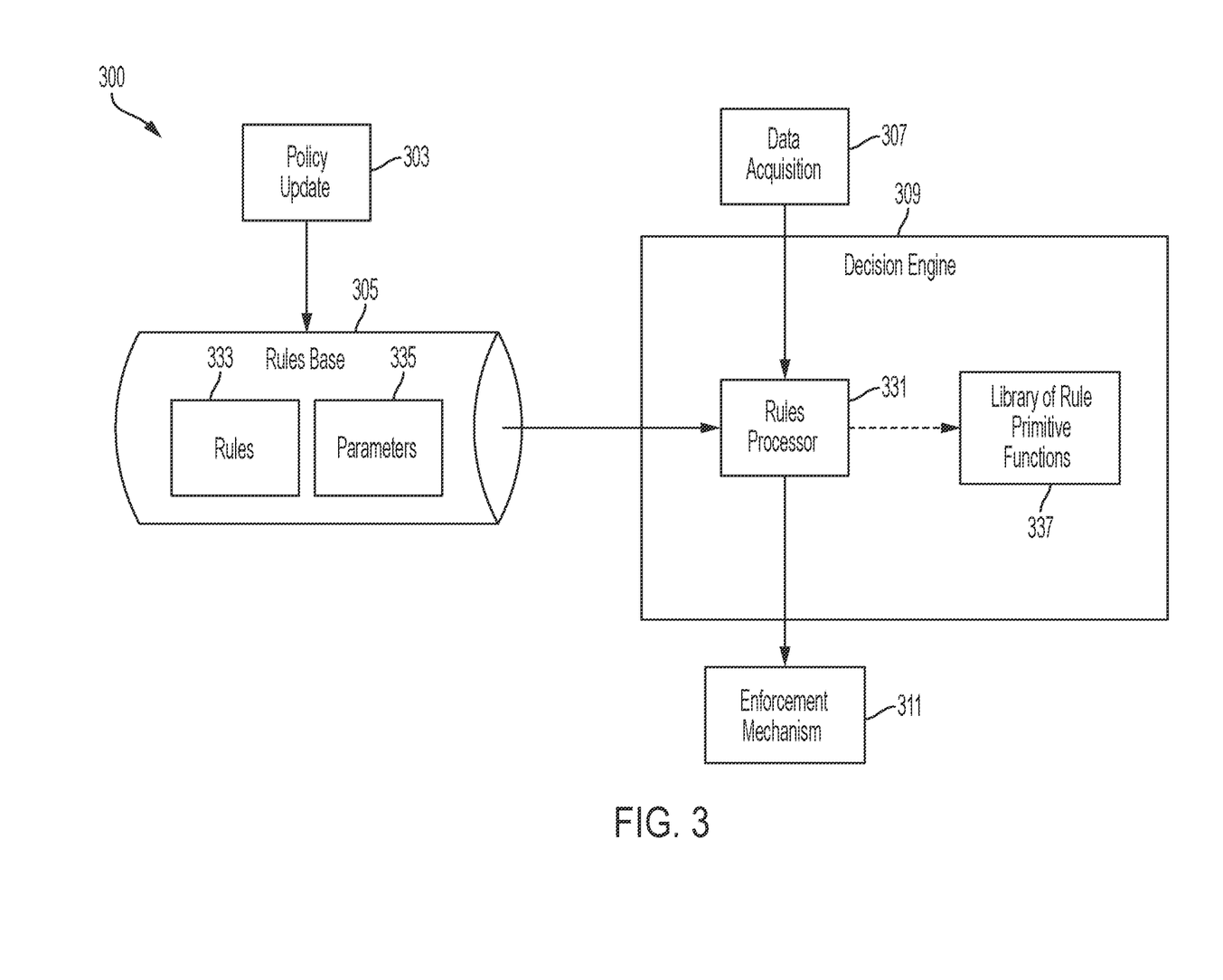
FIG. 3 is a block diagram illustrating a system for initializing rules for selecting access subnetworks in a pre-configured, rules-based decision system according to an aspect of the present disclosure.

FIG. 3 is a block diagram illustrating a system 300 for initializing rules for use by a decision engine 309. As illustrated, the system 300 includes a policy update 303, a rules base 305, a decision engine 309, a data acquisition 307, and an enforcement mechanism 311. The policy update 303, rules base 305, decision engine 309, data acquisition 307, and enforcement mechanism 311 function in a similar manner to the policy update 203, rules base 205, decision engine 209, data acquisition 207, and enforcement mechanism 211 described above in relation to FIG. 2.

In certain embodiments, the rules base 305 may store a set of rules 333. As used herein, the rules may refer to information that dictates to the decision engine how to select a access subnetwork and/or manage characteristics of a access subnetwork for communications from a user application on a vehicle. In some embodiments, a rule set may be created by a fleet manager that controls multiple vehicles. The fleet manager may install the same set of rules for one or more vehicles in the fleet. For example, a vehicle may be part of a fleet of aircraft, where the aircraft within the fleet had the same set of rules stored thereon. Typically, the rules may be installed as part of the software that executes on a vehicle.

Additionally, the rules base 305 may store a set of parameters 335. As used herein, the parameters may refer to configurable information that can be used by the decision engine 309 in conjunction with the rules 333 to select a access subnetwork and/or manage characteristics of a access subnetwork for communication from a user application on a vehicle. For example, whereas rules are common across a fleet of vehicles, parameters can be configured for specific regions of travel, for specific customers, for specific times of travel, or other factors related to the travel of the vehicle and/or user applications executing on the vehicle.

When the decision engine 309 begins operation, the decision engine 309 may perform an initialization process. In certain embodiments, the decision engine 309 may include a rules processor 331. The rules processor 331 may be an embedded processor, or other processing unit such as those described above in connection with the processing unit 107 that executes computer readable instructions to select a access subnetwork and/or manage characteristics of a access subnetwork for communications from a user application on a vehicle.

In certain embodiments, when the decision engine 309 performs the initialization process, the rules processor 331 may chain the rules 333 in a desired order as dictated by the policy update 303. When the rules 333 are chained, the rules processor 331 may bind parameters 335 to the rules chain. Rules processor 331 may then map and bind data received from the data acquisition 307 to variables in the rules 333. When the decision engine 309 is actively making a decision associated with the operation of the access subnetworks, the rules processor 331 may process the rules chain and call appropriate rule primitive functions in a library of rule primitive functions 337, where a function is associated with one or more rules and the bound parameters and acquired data are used as arguments for the called functions. Upon completion of the processing of the rules chain, the rules processor 331 may provide a final decision to the enforcement mechanism 311, where the enforcement mechanism 311 enforces the final decision on the access subnetworks and components associated with communication through the access subnetworks.

Figure 4:
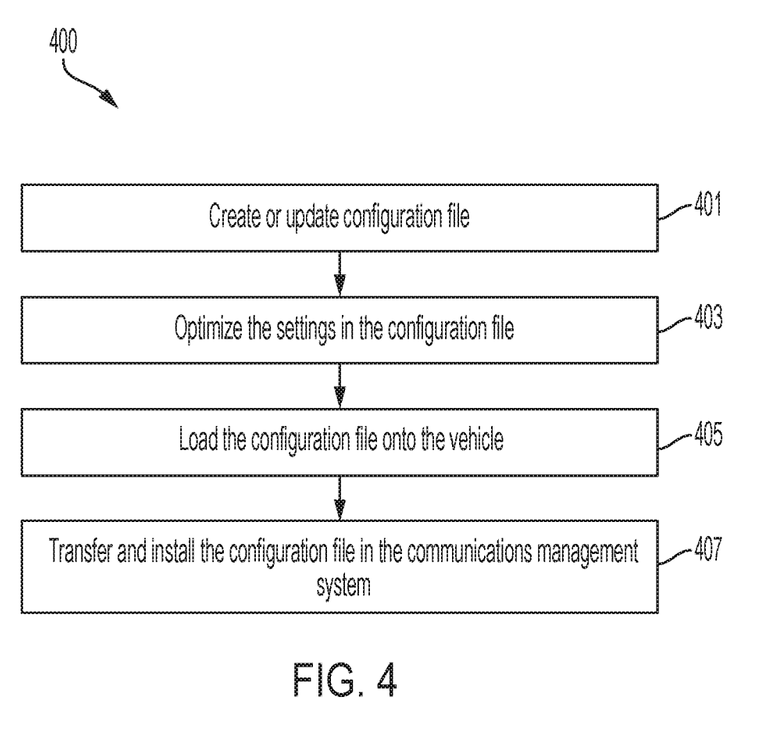
FIG. 4 is a flowchart diagram illustrating an exemplary method for updating a rules set for a pre-configured, rules-based decision system according to an aspect of the present disclosure.

FIG. 4 is a flowchart diagram illustrating an exemplary method 400 for updating rules on a vehicle. For example, a tool may be provided that allows a fleet manager to update a rule set and set and update parameter values. For example, a ground-based tool may be provided to an airline, where the airline uses the ground-based tool to update a rule set and update parameter values for aircraft in a fleet of aircraft. Accordingly, the method 400 proceeds at 401, where a configuration file is created or updated. For example, a fleet manager may use a provided tool to create or update a configuration file with rules and parameters. The configuration file may be created for loading into a communication management system on a vehicle managed by the fleet manager. When the configuration file is created or updated, the method 400 may optionally proceed at 403 where the settings in the configuration file are optimized. For example, the fleet manager may use the tool to optimize the settings in the configuration file using simulation and performance prediction algorithms.

In further embodiments, when the configuration file is created and/or updated and optionally optimized, the method 400 may proceed at 405, where the configuration file is loaded onto the vehicle. For example, the configuration file may be loaded through a local access point or uplinked via an access access subnetwork. When the configuration file is loaded to the vehicle, it may be stored on a data loading device for subsequent installation when convenient for the operation of the vehicle. When installation is convenient for the vehicle, the method 400 may proceed at 407 where the configuration file is transferred and installed in the communications management system. For example, when the vehicle is an aircraft and aircraft is not in-flight, the configuration file may be transferred to the communications management system using a data loading device or service. The configuration file may then be installed where it may be ready then for operational use.

Figure 5:
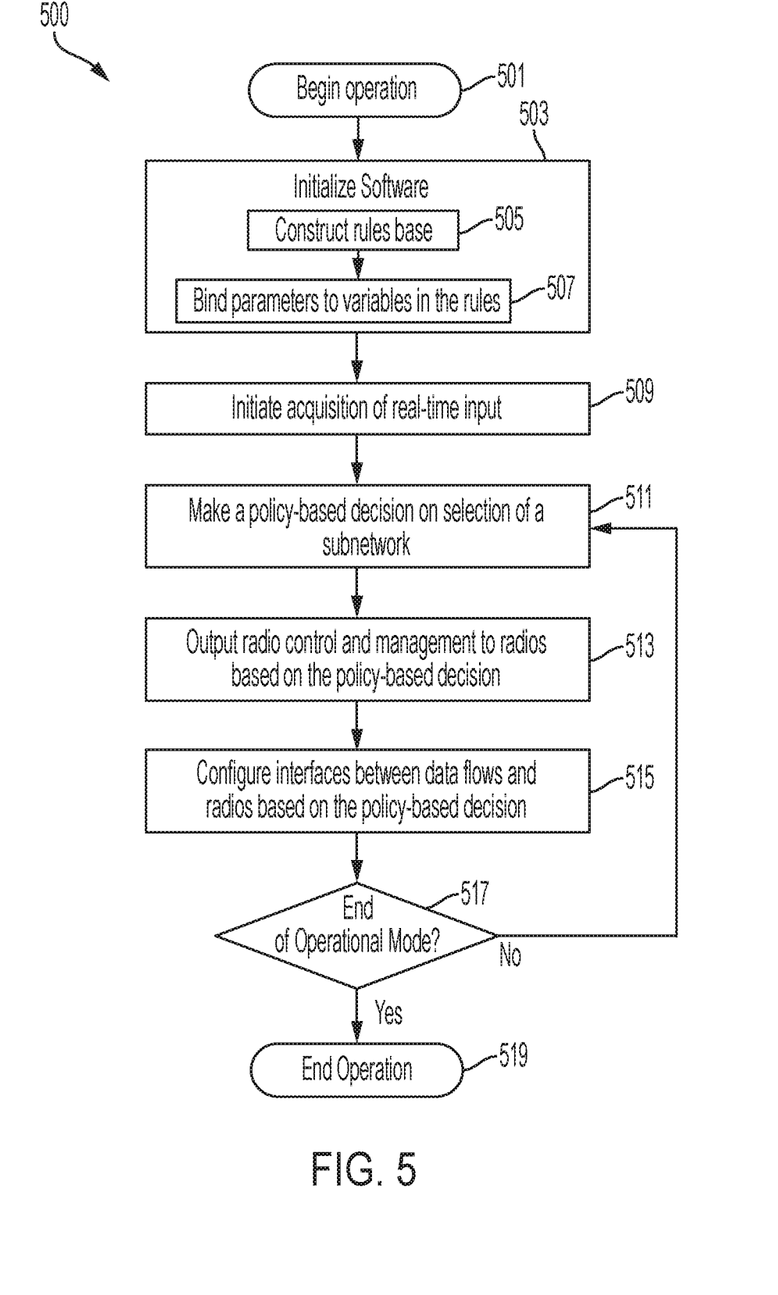
FIG. 5 is a flowchart diagram illustrating an exemplary method for controlling the configuration of access subnetworks in a pre-configured, rules-based decision system according to an aspect of the present disclosure.

In certain embodiments, when the configuration files are installed, the configuration file may be used by installed software when selecting a access subnetwork for communication or managing characteristics of communications through a access subnetwork. FIG. 5 is a flowchart diagram of a method 500 for using the information in the configuration file to select and/or manage a access subnetwork for communications from a vehicle. Method 500 proceeds at 501, where the software begins operation. Upon the beginning of operation, the method 500 proceeds of 503, where the software is initialized. During the initialization of the executing software, the method 500 may proceed at 505, where a rules base is constructed. For example, the rules base may be constructed as a chain of rules as instructed by the installed configuration file. When the rules base is constructed, the method 500 may proceed at 507, where parameters are bound to variables in the rules.

In further embodiments, when the execution of the software completes the initialization process, the method 500 may proceed at 509 where the acquisition of real-time input is initiated. For example, the executing software, such as the software executed by the decision engine 209, may acquire inputs that may include vehicle state information, status information from datalink systems via onboard radio systems, dynamic requests of data communication usage, demands and changes for user applications, network statistics from onboard network stacks, and additional information that may be useful. In some embodiments, the real-time inputs may be acquired periodically, continuously, or requested in response to events.

In some embodiments, when the real-time inputs have been acquired, the method 500 proceeds at 511, where a policy-based decision on selection of a access subnetwork is made. For example, the real-time inputs may be mapped to variables in the rules and parameters. Based on the rules and information, a decision engine may select a access subnetwork. In some embodiments, the policy-based decision is made periodically or may be event driven. When the access subnetwork is selected, the method 500 proceeds at 513 where radio control and management is output to radios based on the policy-based decision. For example, information provided to the radios may include instructions to power up or down, instructions to link to a desired class of service, instructions to start or stop service, and the like. Additionally, the method 500 proceeds at 515 where interfaces between data flows and radios are configured based on the policy-based decision. Also, connectivity between various components in the dataflow and the radios may be configured.

In additional embodiments, when the radios and communication devices are configured, the method 500 may proceed at 517, where it is determined whether the software is at an end of an operational mode. If the software is not at an end of an operational mode, the method 500 returns to 511 to repeat the process of making and enforcing a policy-based decision. In contrast, if the software is at the end of an operational mode, the method 500 may proceed at 519, where operation of the software is ended.

As described above, the rule set is typically programmed as part of a vehicle's communication management software. As such, the program rules and parameter types may be fixed by the software version. Thus, to change the rules and parameter types, new software is created and installed on the vehicle when convenient for the operation of the vehicle. For example, to change the rules on aircraft, new software is created and then provided to the dated voter device. When the aircraft is on the ground, between flights, the software may be installed. However, having to upgrade the software to change parameter values and rule configurations is an expensive and inefficient use of resources and time.

Systems and methods described below provide fleet managers full flexibility for provisioning and maintaining policy-based rules without requiring software changes. Additionally, the rules, parameter types, and parameter values may be updated using one of the selected access subnetworks to stage the updates in a data loader device where later installation may be performed when convenient to the vehicle. Accordingly, the updating of rules, parameter types, and parameter values does not rely on manual data loading using physical, portable storage media. Further, a decision engine may use machine learning to upgrade decision logic and parameters by itself without having to receive updated values from a fleet manager.

Figure 6:
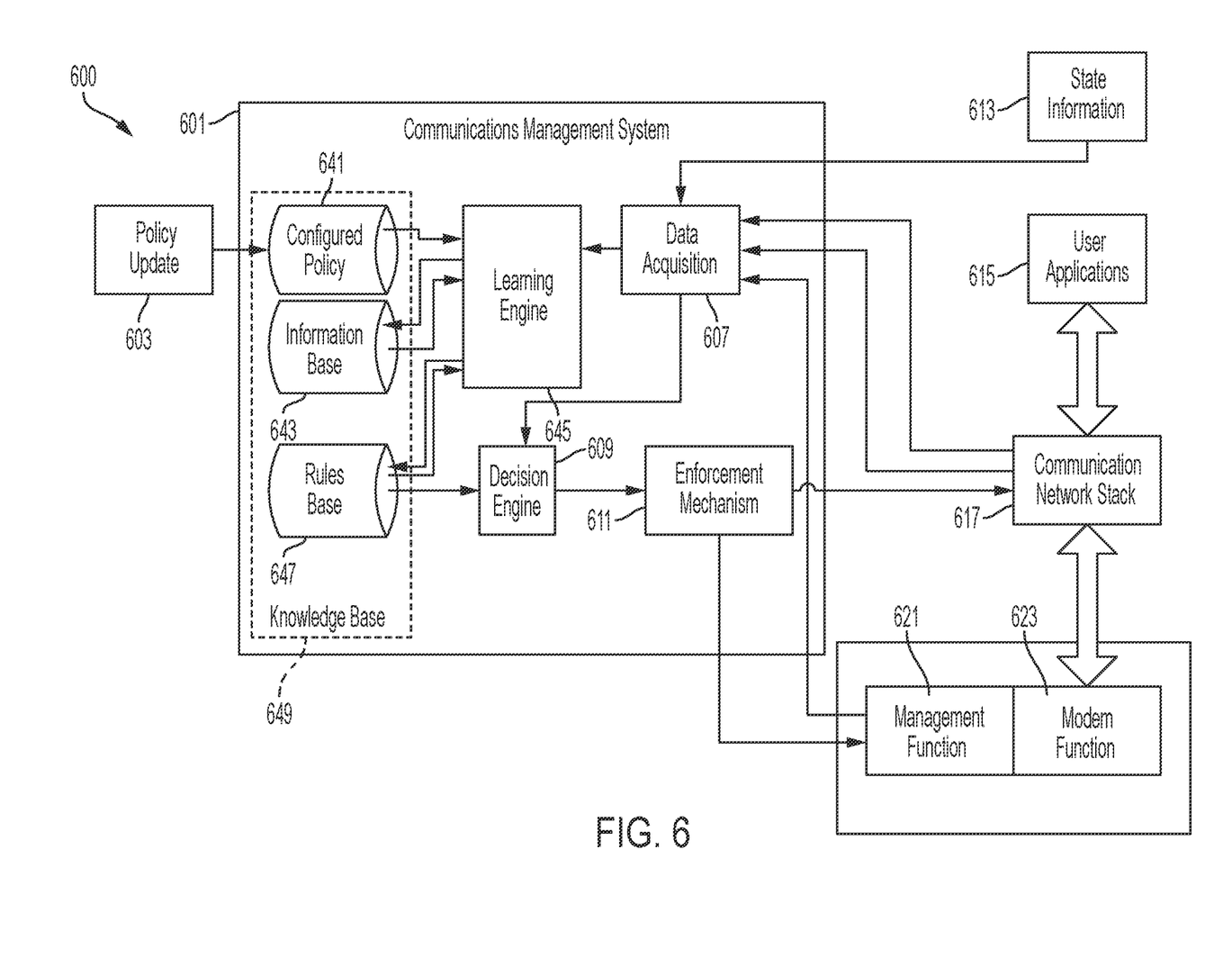
FIG. 6 is a block diagram illustrating an exemplary embodiment of a rules-based decision system using machine learning according to an aspect of the present disclosure.

FIG. 6 is a block diagram illustrating an exemplary embodiment of a rules-based decision system 600 using machine learning. As illustrated, the system 600 includes a knowledge base 649 (consisting of configured policy 641, which can be updated via policy update 603, information base 643, and Rules Base 647), a data acquisition 607, a decision engine 609, an enforcement mechanism 611, state information 613, user applications 615, a communication network stack 617, access subnetwork radios 619, each radio with a management function 621, and a modem function 623.

The system shown in FIG. 6 is a feedback control system. The data acquisition 607 acquires information from other vehicle system components and provides the information to the learning engine 645 to effectively form a feedback loop. The feedback information is connectivity status, network performance and actual QoS experienced by user applications. The learning engine 645 uses this feedback information in addition to inputs consisting of policy, radio availability, state and status, vehicle state, and user application demand. It applies the feedback and inputs to a learning algorithm, which updates the decision logic for selecting and controlling radios and configuring connectivity onboard the vehicle via the enforcement mechanism 611.

In certain embodiments, the system 600 may receive a policy update 603. In contrast to the policy update 203 described above, the policy update 603 may describe two types of possible policy updates. In a first type, the policy update 603 may contain an initial configured policy 641. In some implementations, an initial configured policy 641 may include information related to performance goals of the communication system in addition to the rules described above. For example, performance goals may be related to the speed of communication, the cost of communication, mission objectives, among other desirable performance goals. In some implementations, a mission objective may describe a characteristic that a chosen access subnetwork may satisfy. Exemplary mission objectives may include a least cost communication channel, a least delay communication channel, a secure communication channel, a high integrity communication channel, a low loss communication channel, dynamic changes in application needs, and the like.

Additionally, the initial configured policy 641 may include an indication that the provided rules base is an initial rules base. An initial rules base may be provided upon the initial installation of software or whenever a configured policy 641 is updated and installed. A operations center may also provide the initial configured policy 641 after performing post-processing of data received from the vehicle. In a second type, the policy update 603 may contain an updated rule set that is sent to the vehicle. The communication management systems 601 may update the rules base in the configured policy 641 without having to install the software. Accordingly, new and updated rule sets may be automatically uplinked, loaded and installed in the configured policy 641 without the need for manual administrative configuration. Additionally, new and updated rule sets may be uplinked to a vehicle using any access subnetwork without the need of additional downtime of the vehicle or the use of manual data loading using physical media.

In some embodiments, the communications management system 601 may include a learning engine 645. The learning engine 645 may acquire information from the configured policy 641, the data acquisition 607, and an information base 643. The learning engine may process the acquired information using machine learning techniques to improve the rules base 6 nn. Examples of possible machine learning techniques may include neural networks, deep learning, among other possible machine learning techniques. The improved rules base 647 stored therein, having updated rules based on machine learning techniques and performance goals, is provided to the decision engine 609. Using the improved rules base 647 and data from the data acquisition 607, the decision engine 609 may provide decisions to an enforcement mechanism 611 associated with the configuration of interfaces between data flows and access subnetwork radios along with control and management commands for controlling the access subnetwork radios. Upon reception of the decision from the decision engine 609, the enforcement mechanism 611 may enforce the received decision.

Figure 7:
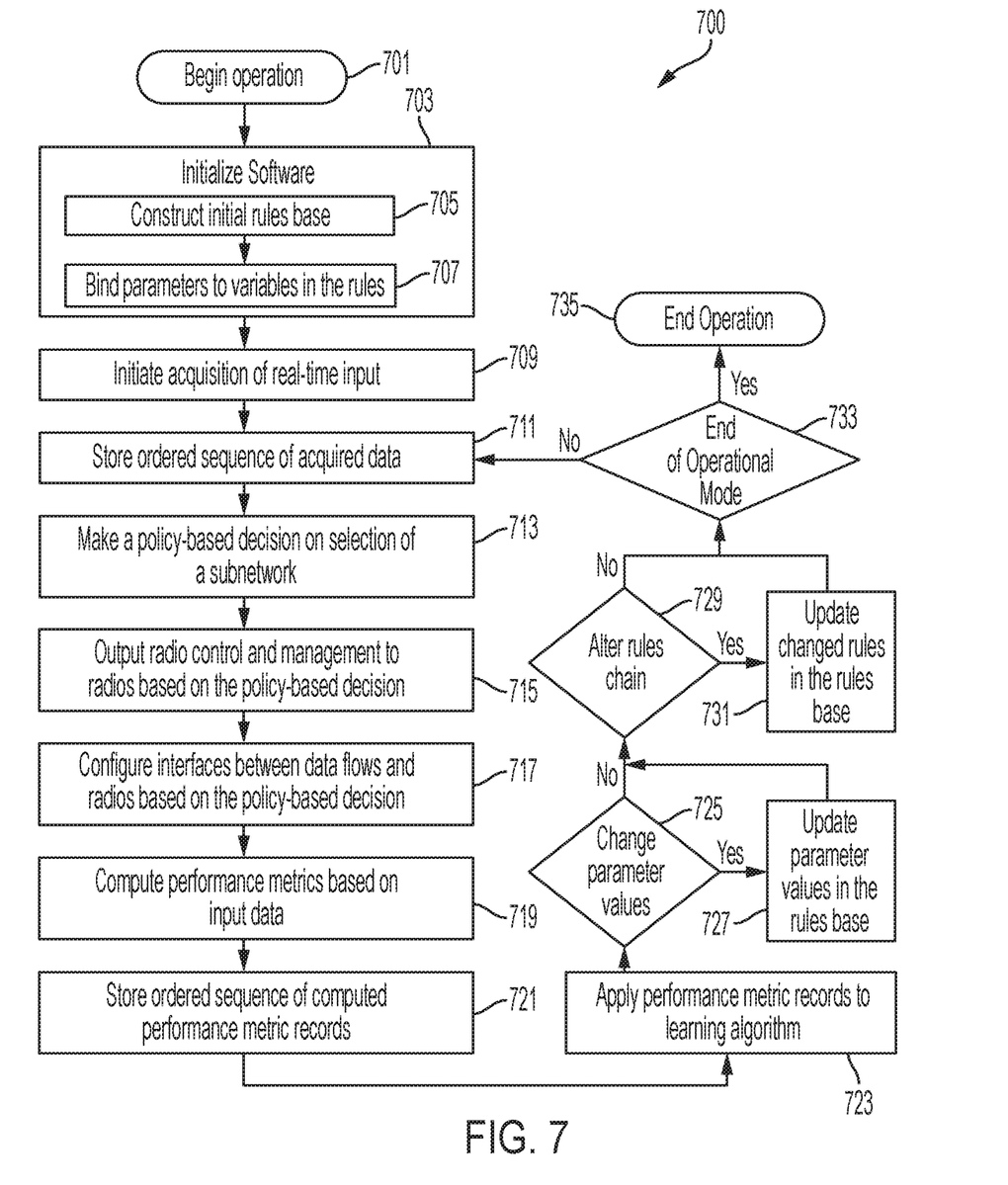
FIG. 7 is a flowchart diagram illustrating an exemplary method for controlling the configuration of access subnetworks in a rules-based decision system with machine learning according to an aspect of the present disclosure.

FIG. 7 is a flowchart diagram of a method 700 for configuring interfaces and managing radios using machine learning. Method 700 proceeds at 701, where the executing software begins operation. During the beginning of operation, the method 700 proceeds of 703, where the software is initialized. During the initialization of the executing software, the method 700 may proceed at 705, where an initial rules base is constructed. For example, the rules base may be constructed as a chain of rules as instructed by an installed configuration file that is received from a configuration file received from a fleet manager, or other system that manages the vehicle. When the initial rules base is constructed, the method 700 may proceed at 707, where parameters are bound to variables in rules in the initial rules base.

In further embodiments, when the execution of the software completes the initialization process, the method 700 may proceed at 709 where the acquisition of real-time input is initiated. For example, the executing software, such as the software executed by the data acquisition 607, may acquire inputs that may include vehicle state information, status information from datalink systems via onboard radio systems, dynamic requests of data communication usage demands and changes for user applications, network statistics from onboard network stacks, and additional information that may be useful. In some embodiments, the real-time inputs may be acquired periodically, continuously, or requested in response to events.

When the acquisition of real-time inputs has been initiated, the method 700 proceeds at 711, where an ordered sequence of acquired data is stored. For example, the acquired data streams received by the data acquisition 607 may be stored as sliding windows of records. When the acquired data streams are stored in sliding windows, the width of a window may be set based on the inputs used for the implemented machine learning algorithms and the onboard storage capacity of the communication management system. In some implementations, the data may be compacted by keeping recent and discarding old values of data types. In additional embodiment, the communication management system may provide the acquired data and/or the filtered records to a fleet manager or other operations center for post-processing and status reporting.

In some embodiments, when the real-time inputs have been acquired and ordered, the method 700 proceeds at 713, where a policy-based decision on a selection of a access subnetwork is made. For example, the real-time inputs may be mapped to variables in the rules and parameters. Based on the rules and information, a decision engine 609 may select a access subnetwork. In some embodiments, the policy-based decision is made periodically or may be event driven. In addition to selecting a access subnetwork, the decision engine 609 may determine configuration changes to be made to the radios. When the access subnetwork is selected, the method 700 proceeds at 715 where radio control and management is output to radios based on the decision. For example, information provided to the radios may include instructions to power up or down, instructions to link to a desired class of service, instructions to start or stop service, and the like. In some embodiments, the management is output in response to the enforcement mechanism 611 receiving the decision from the decision engine 609. Additionally, the method 700 proceeds at 717 where interfaces between data flows and radios are configured based on the decision. Also, connectivity between various components in the dataflow and the radios may be configured.

In certain embodiments, the method 700 proceeds at 719, where performance metrics are computed based on input data. For example, as data is streamed into any combination of the decision engine 609, the data acquisition 607, or the information base 643, the communications management system 601 may compute performance metrics based on the received data, where the received data includes acquired data streams and the configuration of the access subnetwork radios and network configurations.

In additional embodiments, the method 700 proceeds at 721, where an ordered sequence of computed performance metric records is stored. Example of performance metric records or data may include communication link connectivity status, quality of connection, and the like. For example, in a similar manner to the stored ordered sequence of acquired data records, the metrics data streams could be stored as sliding windows of performance metric records. In some implementations, the width of the window may be set based on the needs of executing algorithms and/or on board storage capacity. Additionally, data may be compacted by keeping only recent values of data types. In some embodiments, the performance metric records may be transmitted by the communications management system 601 to a server controlled by a fleet manager at the operations center for post-processing and status reporting.

In certain embodiments, the method 700 proceeds at 723, where the performance metric records may be applied to a learning algorithm. For example, the performance metric records and acquired data may be provided to the learning engine 645. The learning engine 645 may execute a machine learning algorithm on the received data and performance metrics. The method 700 may then proceed at 725, where the learning engine 645 determines whether to change parameter values. If the learning engine 645 determines that parameter values should be changed, the method 700 proceeds at 727, where parameter values are updated in the rules base. For example, the learning engine 645 may update the parameter values stored in the rules base 647 maintained in the knowledge base 649. In some implementations, a history of parameter values may be maintained, and the history may be sent to an operations center for additional post-processing.

When the parameter values have been updated or otherwise been determined that no parameters are to be changed, the method 700 proceeds at 729, where the learning engine 645 determines whether to alter the rules chain. If the learning engine 645 determines that the rules chain should be altered, the method 700 proceeds at 731, where changed rules in the rules base are updated. For example, the learning engine 645 may update the changed rules in the rules base by adding, removing, or reordering rules in the rules base 647 maintained in the knowledge base 649. In some implementations, a history of the changed rules base may be downlinked to an operations center for additional post-processing. When the rules base has been updated or otherwise been determined that the rules base does not need updating, the method 700 proceeds at 733, where the communications management system determines whether an operational mode has ended.

In some embodiments, if the operational mode has ended, the method 700 proceeds at 735, the operation of the communications management system 700 ends. Alternatively, if the operational mode has not ended, the method 700 returns to 711, where the communications management system 601 stores an ordered sequence of acquired data and performs the algorithm again with the potentially updated rules and parameter values.

By using machine learning to update the parameter values and rules base, the chaining and ordering of the rules and the binding of parameters to each rule are flexible using a centralized tool located at the operations center 115 in FIG. 1, to create and update rule sets. For the aviation domain, the centralized tool is a ground-based tool. Additionally, the decision engine 609 may be installed in a one-time implementation and installation and the vehicle may use the rule sets without having to install the decision engine 609 software to include new and updated rules. Further, new and updated rule sets may be automatically uplinked, loaded, and installed on the vehicle without the need for manual administrative configurations and the rule sets may be transmitted to the vehicle using available access subnetworks during operational intervals. Moreover, the use of machine learning may improve the rule base without the need to maintain and update the rule base using tools controlled by an operations center.

Figure 8:
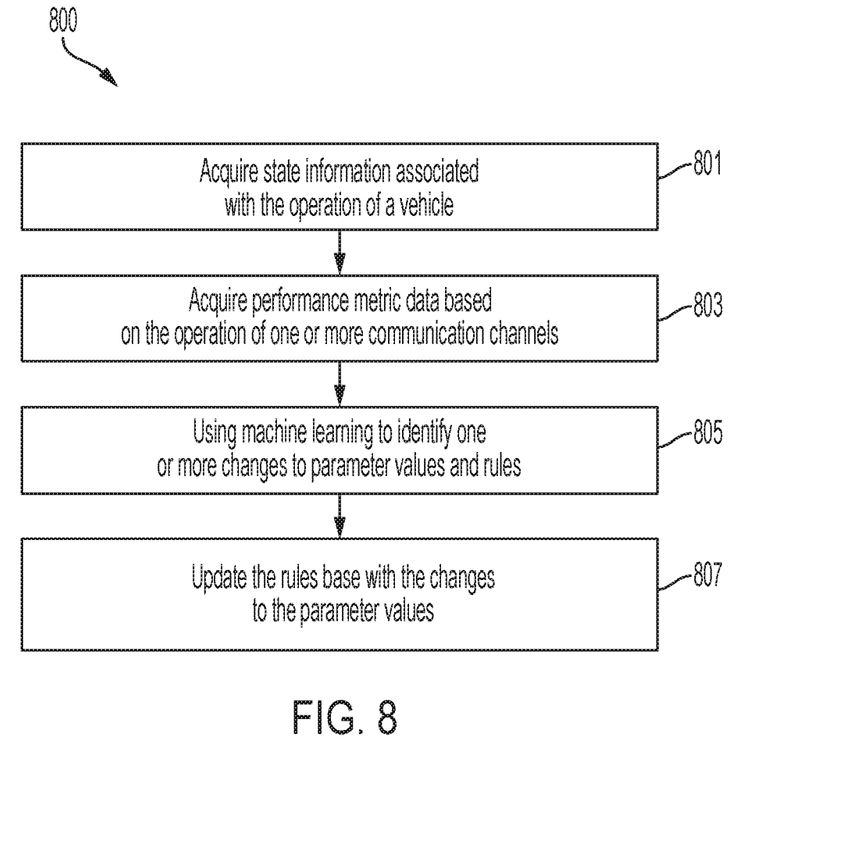
FIG. 8 is a flowchart diagram illustrating an exemplary method for selecting a access subnetwork in a rules-based decision system with machine learning according to an aspect of the present disclosure.

FIG. 8 is a flowchart diagram of a method 800 for updating the rules base in a rules-based decision system with machine learning. The method 800 p proceeds at 801 where state information associated with the operation of a vehicle is acquired. Additionally, the method 800 proceeds at 803 where performance metric data based on the operation of one or more communication channels is acquired. Further, the method 800 proceeds at 805, where machine learning is used to identify one or more changes to parameter values and rules. Also, the method 800 proceeds at 807, where the rules base is updated with the changes to the parameter values.

Example Embodiments

Example 1 includes a system comprising: a memory unit that stores: a knowledge base, wherein the knowledge base stores parametric rules associated with the selection of a communication channel in one or more communications channels, status, performance and usage metrics for communications through the one or more communication channels, vehicle state information, pre-configured policy on use of communication channels; and a processing unit configured to: acquire data related to vehicle state and communication through the one or more communication channels; and update the knowledge base with updated parametric rules without stopping execution of software, wherein the updated parametric rules are created using machine learning performed on the acquired data and the information associated with the performance goals.

Example 2 includes the system of Example 1, wherein the knowledge base comprises an initial rules base during initialization of the software and updates the knowledge base with the updated rules and updated parameter values during execution of the software.

Example 3 includes the system of any of Examples 1-2, wherein the memory unit stores at least one of: an ordered sequence of acquired data records; and an ordered sequence of computed performance metrics.

Example 4 includes the system of any of Examples 1-3, wherein the processing unit computes performance metrics based on at least one of: acquired data; vehicle status; radio configurations; and network configurations.

Example 5 includes the system of any of Examples 1-4, wherein the processing unit provides the updated rules to an operations center.

Example 6 includes the system of any of Examples 1-5, wherein the processing unit updates the parametric rules in the knowledge base by at least one of: adding a rule to a rules chain in the knowledge base; removing a rule from the rules chain in the knowledge base; reordering one or more rules in the rule chain in the knowledge base; and changing parameter values in the knowledge base.

Example 7 includes the system of any of Examples 1-6, wherein the processing unit: computes one or more performance metric records; and applies the one or more performance metric records to the machine learning.

Example 8 includes a method comprising: acquiring state information associated with the operation of a vehicle; acquiring performance metric data based on the operation of one or more communication channels; using machine learning on the acquired state information and the performance metric data, identifying one or more changes to parameter values and rules in a rules base that stores information associated with the selection of a communication channel in the one or more communication channels; and update the rules base with the changes to the parameter values.

Example 9 includes the method of Example 8, wherein the state information comprises at least one of: a vehicle trajectory; a current position; available communication options; and an operating environment.

Example 10 includes the method of any of Examples 8-9, wherein the performance metric data comprises at least one of: communication link connectivity status; and quality of connection.

Example 11 includes the method of any of Examples 8-10, wherein identifying the one or more changes to the parameter values is based on a mission objective, wherein the mission objective comprises at least one of: a least cost communication channel; a least delay communication channel; a secure communication channel; a high integrity communication channel; a low loss communication channel; and dynamic changes in application needs.

Example 12 includes the method of any of Examples 8-11, further comprising initializing the rules base with an initial rules base.

Example 13 includes the method of any of Examples 8-12, further comprising storing the updated rules base and changes to the parameter values in a knowledge base.

Example 14 includes the method of any of Examples 8-13, further comprising computing performance metrics based on at least one of: acquired data; vehicle status; radio configurations; and communication channel configurations.

Example 15 includes the method of any of Examples 8-14, further comprising transmitting the updated rules changes and the parameter values to an operations center.

Example 16 includes the method of any of Examples 8-15, wherein updating the rules base comprises at least one of: adding a rule to a rules chain in the rules base; removing a rule from the rules chain in the rules base; reordering one or more rules in the rule chain in the rules base; and changing parameter values in the rules base.

Example 17 includes the method of any of Examples 8-16, further comprising: computing one or more performance metric records; and applying the one or more performance metric records to the machine learning.

Example 18 includes a system comprising: one or more access subnetwork radios in communication with one or more destinations through one or more access subnetworks; a memory unit that stores: a rules base, wherein the rules base stores information associated with the selection of a communication channel in one or more access subnetworks; and a knowledge base, wherein the knowledge base stores information associated with performance metrics for communications through the one or more access subnetworks; and a processing unit configured to: acquire data related to communication through the one or more access subnetworks; update the rules base with updated rules without stopping execution of software, wherein updated rules are created using machine learning performed on the acquired data and the information associated with the performance goals; and manage communications through the one or more access subnetwork radios based on the updated rules.

Example 19 includes the system of Example 18, wherein the memory unit and the processing unit are part of a communications management system on a vehicle.

Example 20 includes the system of any of Examples 18-19, wherein the knowledge base comprises an initial rules base during initialization of the software and updates the knowledge base with the updated rules and updated parameter values during execution of the software.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An aircraft vehicle comprising:
a plurality of access subnetwork radios in communication with one or more destinations through a plurality of access subnetworks;
a plurality of interfaces;
a memory unit that stores:
a knowledge base, wherein the knowledge base stores parametric rules associated with the selection of a communication channel in a plurality of communications channels associated with the plurality of access subnetwork radios, status, performance and usage metrics for communications through the plurality of communication channels, vehicle state information, pre-configured policy on use of the plurality of communication channels; and
a processing unit that:
acquires data in real-time, wherein the data comprises vehicle geographical position, vehicle data communication needs, communication channel conditions, and communication channel status; and
updates the knowledge base with updated parametric rules without stopping execution of software for configuring interfaces in the plurality of interfaces, wherein the updated parametric rules are created using machine learning performed on the acquired data and the information associated with the performance goals; and configures interfaces in the plurality of interfaces in response to the acquired data between the processing unit and the plurality of access subnetwork radios associated with the plurality of communication channels and components associated with the plurality of communication channels based on the updated parametric rules applied to the data.

2. The aircraft vehicle of claim 1, wherein the knowledge base comprises an initial rules base during initialization of the software and updates the knowledge base with the updated rules and updated parameter values during execution of the software.

3. The aircraft vehicle of claim 1, wherein the memory unit stores at least one of:
an ordered sequence of acquired data records; and
an ordered sequence of computed performance metrics.

4. The aircraft vehicle of claim 1, wherein the processing unit computes performance metrics based on at least one of:
acquired data;
vehicle status;
radio configurations; and
network configurations.

5. The aircraft vehicle of claim 1, wherein the processing unit provides the updated rules to an operations center.

6. The aircraft vehicle of claim 1, wherein the processing unit updates the parametric rules in the knowledge base by at least one of:
adding a rule to a rules chain in the knowledge base;
removing a rule from the rules chain in the knowledge base;
reordering one or more rules in the rule chain in the knowledge base; and
changing parameter values in the knowledge base.

7. The aircraft vehicle of claim 1, wherein the processing unit:
computes one or more performance metric records; and
applies the one or more performance metric records to the machine learning.

8. A method comprising:
acquiring state information associated with operations of an aircraft vehicle that comprises vehicle state, vehicle geographical position and vehicle data communication needs;
acquiring performance metric data describing operations of a plurality of communication channels, wherein the performance metric data comprises communication channel conditions and communication channel status;
using machine learning on the acquired state information and the performance metric data, identifying one or more changes to parameter values and rules in a rules base that stores information associated with the selection of a communication channel in the plurality of communication channels;
update the rules base with the changes to the parameter values; and
configuring interfaces in response to the acquired state information and the acquired performance metric data between data flows and a plurality of access subnetwork radios associated with the plurality of communication channels and connectivity between components in the data flows based on the updated rule base applied to the acquired state information and the acquired performance metric data, wherein the acquired state information and acquired performance metric data is acquired in real time; and transmitting data through the configured interfaces for transmission through at least one access subnetwork radio in a plurality of access subnetwork radios.

9. The method of claim 8, wherein the state information comprises at least one of:
a vehicle trajectory;
a current position;
available communication options; and
an operating environment.

10. The method of claim 8, wherein the performance metric data comprises at least one of:
communication link connectivity status; and
quality of connection.

11. The method of claim 8, wherein identifying the one or more changes to the parameter values is based on a mission objective, wherein the mission objective comprises at least one of:
a least cost communication channel;
a least delay communication channel;
a secure communication channel;
a high integrity communication channel;
a low loss communication channel; and
dynamic changes in application needs.

12. The method of claim 8, further comprising initializing the rules base with an initial rules base.

13. The method of claim 8, further comprising storing the updated rules base and changes to the parameter values in a knowledge base.

14. The method of claim 8, further comprising computing performance metrics based on at least one of:
acquired data;
vehicle status;
radio configurations; and
communication channel configurations.

15. The method of claim 8, further comprising transmitting the updated rules changes and the parameter values to an operations center.

16. The method of claim 8, wherein updating the rules base comprises at least one of:
adding a rule to a rules chain in the rules base;
removing a rule from the rules chain in the rules base;
reordering one or more rules in the rule chain in the rules base; and
changing parameter values in the rules base.

17. The method of claim 8, further comprising:
computing one or more performance metric records; and
applying the one or more performance metric records to the machine learning.

18. A system comprising:
a plurality of access subnetwork radios in communication with one or more destinations through a plurality of access subnetworks;
a plurality of interfaces;
a memory unit that stores:
a rules base, wherein the rules base stores information associated with the selection of a communication channel in the plurality of access subnetworks; and
a knowledge base, wherein the knowledge base stores information associated with performance metrics for communications through the plurality of access subnetworks; and
a processing unit coupled to the plurality of access subnetwork radios through the plurality of interfaces, wherein the processing unit:
acquires real-time data about operations of the communications through the plurality of access subnetworks, wherein the real-time data comprises vehicle geographical position, vehicle data communication needs, communication channel conditions, and communication channel status;

updates the rules base with updated rules without stopping execution of software for configuring the plurality of interfaces, wherein updated rules are created using machine learning performed on the acquired data and the information associated with the performance goals; and configures interfaces in response to the acquired data between data flows and the plurality of access subnetwork radios and connectivity between components in the data flows based on the updated rules applied to the acquired data, wherein the processing unit transmits data through the configured interfaces for transmission through at least one access subnetwork radio in the plurality of access subnetworks.

19. The system of claim 18, wherein the memory unit and the processing unit are part of a communications management system on an aircraft vehicle.

20. The system of claim 18, wherein the knowledge base comprises an initial rules base during initialization of the software and updates the knowledge base with the updated rules and updated parameter values during execution of the software.

* * * * *

UNITED STATES PATENT AND TRADEMARK OFFICE
CERTIFICATE OF CORRECTION

PATENT NO. : 12,495,281 B2
APPLICATION NO. : 16/669159
DATED : December 9, 2025
INVENTOR(S) : Toth et al.

It is certified that error appears in the above-identified patent and that said Letters Patent is hereby corrected as shown below:

In the Claims

Claim 8: Column 17, Line 43, please remove "vehicle state," between "that comprises" and "vehicle geographical position"

Signed and Sealed this
Thirteenth Day of January, 2026

John A. Squires
*Director of the United States Patent and Trademark Office*